J. A. HARD.
Neck-Tie Fasteners.

No. 140,412            Patented July 1, 1873.

Witnesses.
E. E. Lewis
D. L. Hoadley

Inventor.
Josiah A. Hard

UNITED STATES PATENT OFFICE.

JOSIAH A. HARD, OF LAWRENCE, KANSAS.

IMPROVEMENT IN NECK-TIE FASTENERS.

Specification forming part of Letters Patent No. 140,412, dated July 1, 1873; application filed May 6, 1873.

*To all whom it may concern:*

Be it known that I, JOSIAH A. HARD, of Lawrence, in the county of Douglas and State of Kansas, have invented a new and useful Improvement in Neck-Tie Fasteners; and I do hereby declare that the following is a full, clear, and exact description of the construction and operation of the same, reference being had to the annexed drawing making a part of this specification, and to the letters and figures of reference marked thereon.

Figure 1:
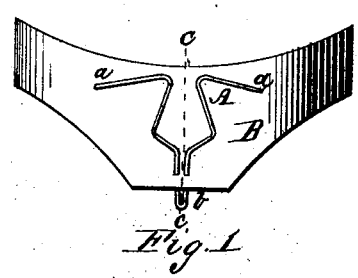
Figure 2:
Figure 3:
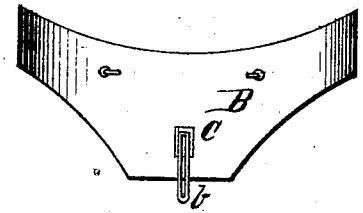

Figure 1 of the drawing represents a front view of my invention. Fig. 2 is a transverse section of the same in the plane $cc$. Fig. 3 is a back view of the hook.

This invention has relation to neck-tie fasteners; and consists in providing the shield of a neck-tie with a spring-wire frame, a portion of which forms a hook to be attached to the loop on the disk of a collar-button, thereby effecting a durable and elastic connection between the shield and the collar-button in such a manner as to push the shield snug up under the shirt-collar, substantially as hereinafter more fully specified.

Referring to the drawing, A designates a spring-wire frame, the ends $a\ a$ of which are bent back, passed through the wings of a neck-tie shield, B, and clinched on the opposite side, thus securing the frame A to the shield B. In the lower central portion of the frame A is formed a hook, $b$, capable of being hooked into the loop on the disk of a collar-button, for the purpose of holding the neck-tie in a proper position. The hook $b$ is passed through a slot, C, in the shield B, before the frame A is attached to the shield by the ends $a\ a$. The lower portion of the frame A, immediately adjoining the hook $b$, extends to the bottom of the slot C. The elasticity of the frame A permits the hook $b$ to be pushed upward when the shield B is being placed under the collar after the hook $b$ has been attached to the collar-button. The downward pressure of the frame A on the hook $b$, when it rests on the loop of the collar-button, pushes the shield B well up under the collar.

The frame A is made of untempered steel-wire, and afterwards tempered to obtain elasticity, except the ends $a\ a$, which should remain untempered.

What I claim as my invention, and desire to secure by Letters Patent, is—

The spring-wire frame A, provided with the bent ends $a\ a$ and hook $b$, in combination with a neck-tie shield, B, all constructed and arranged to operate substantially as and for the purpose described.

In testimony that I claim the foregoing as my invention I hereunto affix my signature this 1st day of May, 1873.

JOSIAH A. HARD.

Witnesses:
    E. E. LEWIS,
    D. L. HOADLEY.